March 16, 1965     T. ANDERSON     3,174,153
SWEEPING IMAGE MIRROR CAMERA
Filed Aug. 8, 1961
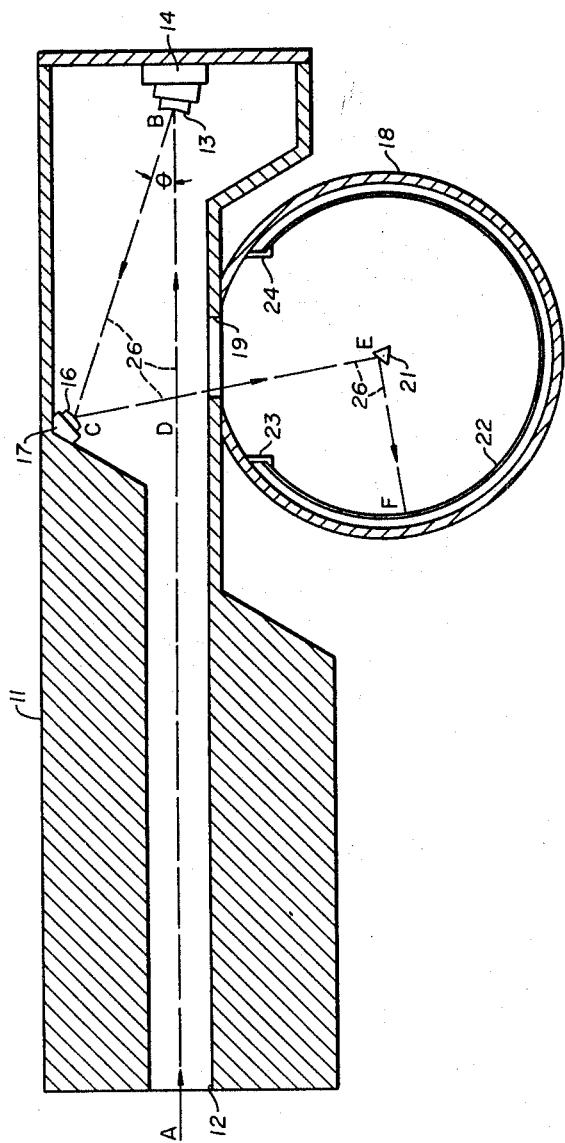
INVENTOR.
THURE ANDERSON
BY
ATTORNEY.

3,174,153
SWEEPING IMAGE MIRROR CAMERA
Thure Anderson, Castro Valley, Calif., assignor to the United States of America as represented by the United States Atomic Energy Commission
Filed Aug. 8, 1961, Ser. No. 130,202
2 Claims. (Cl. 352—84)

This invention relates to cameras, and in particular to high speed cameras employing a reflecting mirror optical system.

In the art of photographing a sequence of rapidly varying events of an extremely short duration, it is necessary to have very high speed cameras. Such cameras find a diversity of application in the various fields of physics and engineering science and are especially useful for the scientific study of nuclear phenomena.

However, in those cameras found in the prior art, serious limitations as to fast writing speeds and chromatic aberration have been caused by the use of optical systems utilizing lenses. It is well known that chromatic aberration is inherent in lens systems. The aberration results from chromatic light, which varies in wave length, being refracted through the optical lenses in different time intervals. This type of aberration can never be completely corrected in a lens system. The writing speeds have been limited by both the bursting speed of the rotating mirror (dependent upon materials used) and by the effective lens aperture ratio obtained with respect to the amount of light that could be made incident upon a fast emulsion film.

The camera of this invention is a sweep camera which in general teaches the use of curved mirrors for providing a brighter image upon fast photographic film. The use of reflecting mirrors eliminates the problem of chromatic aberration, and the use of reflecting mirrors, in combination with a rotating mirror type film drum, provides faster film writing speeds than heretofore available by virtue of the brighter image which is obtained.

In order to obtain a large "$f$" number in the optical system of the present camera, it was necessary to orient the optical axis of the objective mirror at an angle to the light rays entering the camera housing. This "off-axis" placement of the objective mirror introduces astigmatism or "off-axis aberration" into the camera's optical system. If the astigmatism were to remain uncorrected, the resultant loss in resolution would severely impair the usefulness of the camera. The problem is solved in a novel manner in the present camera by disposing a cylindrically curved mirror in the path of the astigmatic image reflected from the objective mirror. The cylindrical mirror corrects the astigmatic image by causing the tangential and sagittal image components to coincide with one another. In this manner, astigmatism is removed from the optical system while still retaining a high overall "$f$" number.

Although the cylindrically corrected reflecting system was originally developed for use with the camera described herein, the use of a cylindrical mirror placed in the path of a reflected astigmatic image represents a general method whereby astigmatism can be corrected in other reflecting optical systems.

The camera of the present invention comprises, in general, a camera housing enclosing a system of two curved mirrors for reflecting light. This light emanates or is reflected from an object to be photographed, through the mirrors into a film drum having disposed therein a high speed rotor mirror. The light received upon the rotor mirror is projected therefrom onto a photosensitive film disposed in an arc within the cylindrical drum. The fast rotor mirror enables the reflected light image to be swept along an arc length of the film at a high velocity during the instant film recording interval.

It is therefore an object of the invention to provide an ultra high speed camera capable of a film sweeping rate far in excess of any camera heretofore known in the art.

It is another object of this invention to provide a chromatic aberration-free high speed camera.

It is still another object of this invention to provide a mirror system corrected for astigmatism and aberration.

It is a further object of this invention to provide an object-to-film optical system which has minimized light reflection losses resulting in an especially brighter image and attendantly shorter film exposure time.

It is a still further object of this invention to provide a method whereby astigmatism can be corrected in reflecting optical systems.

The invention will be described with reference to the accompanying drawing, of which the sole figure is a schematic view of the camera showing the path taken by light rays from an object being photographed.

Referring now to the figure, the preferred embodiment of the present invention is shown to comprise a tubular, light-tight, generally-elongated camera housing 11 having an objective aperture 12 at a forward end thereof and a rectangular sectioned, concave spherical mirror 13 rigidly supported in a mirror holder 14 fixedly secured to the rear end of housing 11. A rectangular sectioned, convex cylindrical mirror 16 and cylindrical mirror holder 17 are mounted on a lateral side of tubular housing 11 at approximately the median vertical plane thereof. A cylindrical film drum 18 is mounted against the exterior of housing 11. A narrow aperture 19 in the wall of film drum 18 facilitates communication between the interiors of housing 11 and drum 18.

Within the drum there is provided an elongated triangular rotating mirror 21 mounted centrally thereof. A photosensitive film 22 and film holders 23 and 24 are mounted within film drum 18 to hold the film in an arc in juxtaposition to the curved periphery thereof.

In order to illustrate the operation of the camera, the path of incident light rays is indicated in the figure as a dashed line 26. It can be seen that the optical axis of mirror 13 is at an angle to the incident light rays. This "off-axis" placement of mirror 13 is necessary to achieve a high overall "$f$" number for the reflecting system. This effect can be more readily understood by considering a design in which mirror 13 was placed "on-axis," that is, the optical axis of the mirror was coincident with the incoming light rays. In such a design, it would be necessary to dispose an inclined second mirror directly in the path of the incident rays, so as to reflect the image from mirror 13 into the film drum. The area of the secondary mirror would block out or "mask" the effective reflecting area of mirror 13, thereby reducing the overall "$f$" number of the system. It is apparent, therefore, that the "off-axis" placement of mirror 13 is necessary for the preservation of a high "$f$" number. However, as mentioned previously, "off-axis" placement of the objective mirror results in astigmatism of the reflected image. If this astigmatism were to remain uncorrected, the reflected image from mirror 13 could not be brought to a sharp focus, and the resolution of the camera would thereby be decreased. Astigmatism is corrected in a novel manner in the present camera by disposing a cylindrically curved convex mirror 16 in the path of the image reflected by mirror 13. The cylindrical curvature of mirror 16 causes the tangential and sagittal astigmatic images to merge and be brought to a sharp focus at the reflecting surface of rotating mirror 21. Mirror 21, in turn, "sweeps" the resulting focused image onto film 22. From the foregoing, it is apparent that the novel design of the present camera permits an unusually high "f" number to be achieved, while at the same time correcting for inherent astigmatism.

*Example*

In one specific embodiment of the present invention, the camera utilized a first spherically concave mirror 13 of rectangular section having a spherical focal length of 11.5 inches, a diameter of 6 inches, and a rectangular height of 1 inch. The cylindrically curved convex mirror 16 had a cylindrical curvature corresponding to 12 fringes and a chord length of 1.75 inches. A wavelength of light employed in adjusting the curvature of mirror 16 will vary depending upon the particular wavelength of light that is to be recorded by the camera. However, where white light is to be recorded, maximum resolution is obtained by adjusting the curvature of mirror 16 for the middle of the white light spectrum, i.e., approximately 5500 angstroms. The camera utilized a rotor mirror 21 of special design for improved camera speeds, that is, a long slender, trucated triangular prism of unusually large length-to-width ratio. In the specific embodiment the prism has a length of 2 inches and a surface width of 5/16 inch.

The first mirror was positioned along the tubular axis of housing 11 a distance AB of 23 inches from the object to be photographed. The mirror axis was off-set from the housing axis by an incidence angle θ of 3.5 degrees which gave a total reflection angle of 7 degrees to the incoming light. The second mirror 16 was mounted a distance BC of 8.25 inches from the first mirror and a distance CD of 1.125 inches from the tubular axis of the housing to the center of the second mirror. The light image received from the first mirror was reflected 70 degrees by the second mirror through the film drum aperture 19 and upon the rotating mirror 21 mounted a distance CE of 8.75 inches from the surface of the second mirror. The film was disposed in a circular arc within the film drum at a radial distance EF of 6 inches from the center of the rotor mirror. The optical distance AB was equal to the optical path distance BCDEF. The overall aperture ratio was F:8 for the built camera system of the present embodiment. The resultant rotor speed of the camera was 32,000 revolutions per second which corresponded with a writing speed of 56 millimeters of film per microsecond. The use of prisms having faster writing speeds than those in known cameras was afforded by the far brighter image obtained through the use of the mirror system of the present embodiment.

Although the invention has been described hereinbefore with reference to a preferred embodiment utilizing a film drum and rotor mirror, any film box, suitable recording means, and the like may as well be employed without departing from the spirit and scope of the invention as delineated by the following claims.

What is claimed is:
1. Apparatus for photographing high speed events comprising,
 (a) a film box defining a cylindrical interior surface portion, said film box structure defining an aperture to provide light passage to its cylindrical interior portion,
 (b) a film mount means for positioning a film within said film box along its cylindrical interior peripheral surface,
 (c) an elongated triangular shaped mirror rotatably mounted centrally within said film box to receive the light passing through said aperture and sweep same upon the film positioned within said film box,
 (d) a concave spherical mirror of rectangular section disposed with its principal axis at an angle to the axis of a light beam incident upon said mirror from an object being observed, said spherical mirror adapted to form a first reflected image of said object, and
 (e) a convex cylindrical mirror disposed outside the margin of said incident beam with its longitudinal axis being substantially perpendicular to the plane defined by the axis of the incident beam and a principal axis of said spherical mirror to have its reflecting surface center located at a point equally distant between the sagittal and tangential image components of said first reflected image to receive the light forming the first reflected image and direct it through the aperture of said film box to form a second reflected image on said rotating mirror, said cylindrical mirror adapted to bring the sagittal and tangential components of said second reflected image into coincidence.

2. Apparatus for photographing high speed events comprising
 (a) a camera housing defining at an end thereof an objective aperture for light passage therethrough for light definitive of an object to be photographed,
 (b) a concave spherical mirror or rectangular section mounted within said housing at an end opposite said objective aperture in the path of said light passing therethrough with its principal axis at an angle to the path of said incoming light, said spherical mirror adapted to form a first reflected image of said object,
 (c) a convex cylindrical mirror mounted within said housing at a side wall thereof with its longitudinal axis being substantially perpendicular to the plane defined by the path of the incoming light and the principal axis of said spherical mirror to have its reflecting surface center located at the point equally distant between the sagittal and tangential image components of said first reflected image to intercept the light forming the first reflected image and direct it through an aperture defined by the lateral side of said housing opposite said cylindrical mirror.
 (d) a film drum provided with a second aperture mounted on said housing in aperture alignment thereby providing light passage from said cylindrical mirror to the interior of said film drum,
 (e) a film mount means for positioning a film within said drum along the interior peripheral surface of said drum and,
 (f) a truncated elongated triangular mirror rotatably mounted centrally within said film box with its principal axis substantially parallel to the longitudinal axis of said cylindrical mirror to receive light reflected by said cylindrical mirror through the apertures of said housing and drum and sweep same upon the film positioned within said film box.

References Cited by the Examiner
UNITED STATES PATENTS

| | | | |
|---|---|---|---|
| 1,525,658 | 2/25 | Roach | 88—84 |
| 2,531,783 | 11/50 | Mosca | 95—11 |
| 2,548,548 | 4/51 | Menzies et al. | 88—14 |
| 2,822,721 | 2/58 | Parker et al. | 88—16 |
| 2,853,918 | 9/58 | Yoler | 88—16 |

FOREIGN PATENTS
475,371 7/51 Canada.

EVON C. BLUNK, *Primary Examiner.*
EMIL G. ANDERSON, NORTON ANSHER,
*Examiners.*